Oct. 16, 1951     C. M. MAYER     2,571,741
BURNER GRATE

Filed Dec. 2, 1949     2 SHEETS—SHEET 1

INVENTOR
Chas. M. Mayer
BY
Chas. H. Trotter
ATTORNEY

Oct. 16, 1951     C. M. MAYER     2,571,741
BURNER GRATE

Filed Dec. 2, 1949     2 SHEETS—SHEET 2

INVENTOR.
Chas. M. Mayer
BY Chas. H. Trotter
Atty.

Patented Oct. 16, 1951

2,571,741

UNITED STATES PATENT OFFICE 2,571,741

BURNER GRATE

Charles M. Mayer, Mansfield, Ohio, assignor to The Tappan Stove Company, Mansfield, Ohio, a corporation of Ohio Application December 2, 1949, Serial No. 130,706

2 Claims. (Cl. 126—214)

This invention relates to a combined burner grate and drip pan assembly for cooking ranges using gaseous fuel. In ranges of this type an open grate is provided over each top burner to support a utensil a fixed distance above a burner in order that the maximum amount of heat generated by the burner may be properly utilized. The grate also serves to support a utensil a fixed distance above the top of the range in order to provide a space between the top of the stove and the bottom of the utensil through which the products of combustion may escape. A drip pan is also provided to catch anything that may spill or boil over from a utensil. Generally the grate and drip pan are independent of each other, one being disposed over the burner and the other being disposed under the burner.

According to my invention the grate and drip pan are combined so that one is dependent upon the other. The drip pan is mounted in and supported by the top of the range and the grate is mounted in and suported by the drip pan. The drip pan and grate may be readily removed as a single unit from the range top after which the grate may be removed from the pan, or the grate may be removed without disturbing the pan.

The principal object of my invention is to provide an efficient and effective combined grate and drip pan which is of simple construction and which is relatively inexpensive to manufacture.

Another object of the invention is to provide a combined grate and drip pan which may be readily removed from, and replaced in a cooking range, for cleaning purposes.

Another object of the invention is to provide a burner grate which cannot be easily broken as by dropping it, or letting a utensil or other object fall on it.

Another object of the invention is to provide a burner grate which is formed from a single endless piece of spring wire.

Other and more limited objects of the invention will be apparent from the following specification and the accompanying drawings forming a part thereof wherein.

Figure 1:
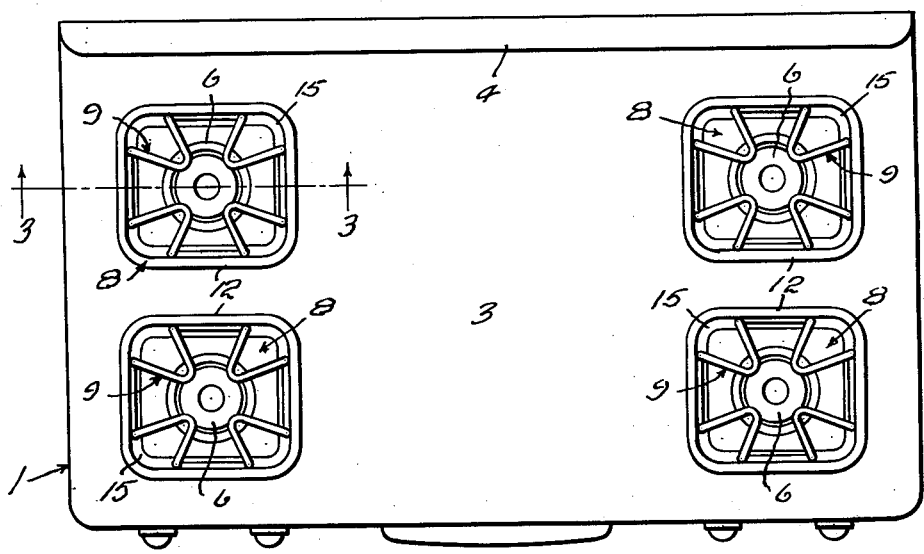
Fig. 1 is a fragmentary top plan view of a cooking range using gaseous fuel and having my new and improved combined grate and drip pan assembly incorporated therein.
Figure 4:
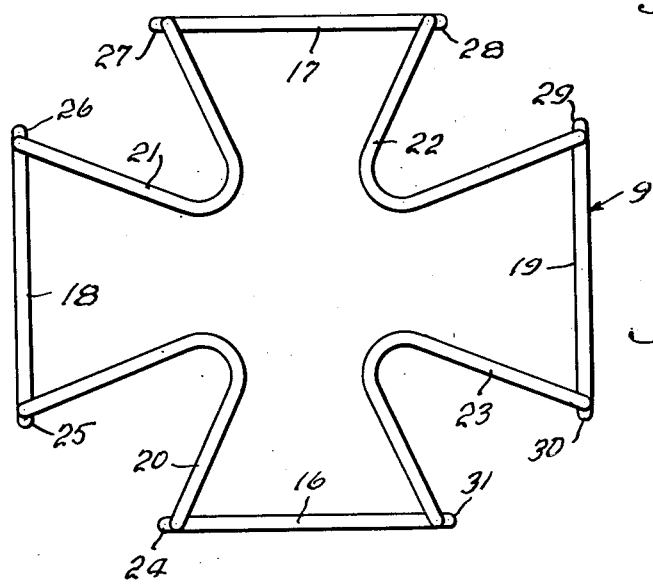
Fig. 4 is a plan view of the burner grate removed from the drip pan.
Figure 5:
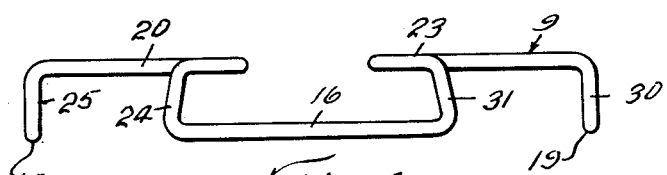
Fig. 5 is a side elevation of the burner grate as shown in Fig. 4.
Figure 2:
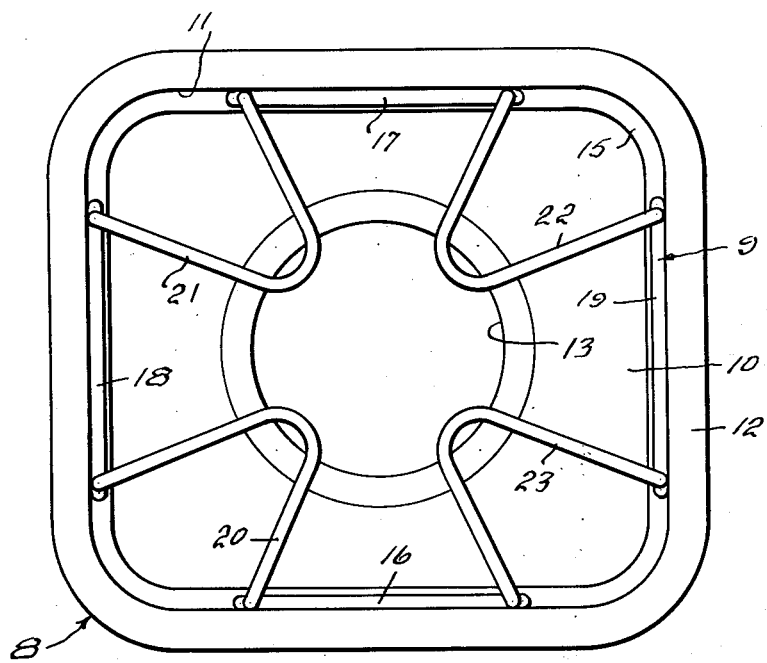
Fig. 2 is a plan view on a larger scale of my burner grate and drip pan assembly showing it removed from the range.

Referring now to the drawings by reference characters the numeral 1 indicates generally a gas cooking range having a body 2, a top 3 and a splash back 4. A top burner compartment 5, in which is suitably mounted a plurality of gaseous fuel burners 6, is provided beneath the top 3. The top 3 has a plurality of openings 7 therein, there being one opening 7 above each burner 6. The openings 7 are generally rectangular in shape and are preferably coaxial with the burner 6. A drip pan 8 is removably mounted in each opening 7, and a utensil supporting grate 9 is removably mounted in each drip pan 8.

Figure 3:
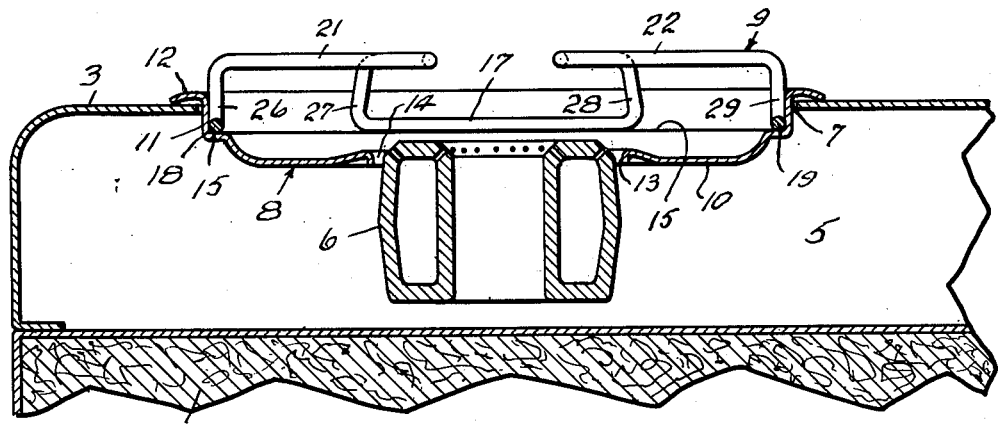
Fig. 3 is a transverse section on the scale of Fig. 2 taken on the line 3—3 of Fig. 1.

The drip pans 8 are all identical and are of such a size and shape as to fit snugly within the openings 7. They are formed from sheet metal and each comprises a bottom 10 and an annular side wall 11 formed integral therewith and extending upwardly therefrom. The upper edge of the side wall 11 terminates in an outwardly extending annular flange 12 which is adapted to engage the top 3 of the range about an opening 7 and is provided to hold the drip pan 8 in proper position in an opening 7. The bottom 10 has a central aperture 13 through which the top of a burner 6 is adapted to project when the pan is mounted in a range. As shown in Fig. 3 the aperture 13 is made slightly larger than the burner 6 to provide an annular space 14 about the burner 6 through which air to support combustion may flow. An annular shoulder 15 is formed in the side wall 11 to provide a supporting surface for one of the utensil supporting grates 9.

The utensil supporting grates 9 are all indentical and are formed from single pieces of spring wire of such size and strength as to provide a grate that will not be unduly deflected by a utensil thereon. Each grate 9 comprises a pair of spaced parallel similar bearing sections 16 and 17, a second pair of spaced parallel similar bearing sections 18 and 19, and four generally V-shaped utensil supporting fingers 20, 21, 22 and 23. The bearing sections 16, 17, 18 and 19 are all disposed in the same plane with the sections 18 and 19 at right angles to the sections 16 and 17. The utensil supporting fingers 20, 21, 22 and 23 are disposed in a plane which is a fixed distance above and parallel to the plane of the bearing sections 16 to 19, inclusive, and are connected to the ends of the bearing sections 16 to 19 by downwardly extending links. The finger 20 is connected to one end of the section 16 by a link 24 and to one end of the section 18 by a link 25. The finger 21 is connected to the other end of the section 18 by a link 26 and to one end of the section 17 by a link 27. The finger 22 is connected to the other end of the section 17 by a link 28 and to one end of the section 19 by a link 29. The finger 23 is connected to the other end of the section 19 by a link 30 and to the other end of the section 16 by a link 31. These bearing sections 16 to 19, inclusive, are adapted to seat on the shoulder 15 and to resiliently engage the annular wall 11 of the drip pan 8 so that the grate 9 cannot shift with respect to the drip pan 8, but can be readily removed from and inserted into the drip pan. In use the supporting surface of the fingers 20 to 23 is disposed a fixed distance above a burner 6 and the top 3 of the range which distance is determined by the position of the shoulder 15 with respect to the annular flange 12 and the length of the links 24 to 31, inclusive.

From the foregoing it will be apparent to those skilled in this art that I have provided a very simple and efficient mechanism for accomplishing the objects of my invention.

It is to be understood that I am not limited to the specific construction shown and described herein as various modifications can be made therein within the scope of the appended claims.

What is claimed is:

1. A burner grate formed from a single piece of spring wire and comprising a first pair of spaced parallel elongated straight bearing sections, a second pair of spaced parallel elongated straight bearing sections disposed at right angles to said first pair of bearing sections and in the same plane therewith, a plurality of substantially radially extending V-shaped utensil-supporting fingers disposed in a plane a fixed distance above said first mentioned plane, and a plurality of upwardly extending links connecting the ends of said sections directly to the ends of said V-shaped supporting fingers.

2. A burner grate formed from a single piece of spring wire and comprising a first pair of spaced parallel elongated straight bearing sections, a second pair of spaced parallel elongated straight bearing sections disposed at right angles to said first pair of bearing sections and in the same plane therewith, a plurality of substantially radially extending V-shaped utensil-supporting fingers disposed in a plane a fixed distance above said first mentioned plane, and a plurality of upwardly extending links connecting the ends of said sections directly to the ends of said V-shaped supporting fingers, each of said V-shaped supporting fingers being connected to two angularly disposed bearing sections.

CHARLES M. MAYER.

REFERENCES CITED

The following references are of record in the file of this patent:

UNITED STATES PATENTS

| Number | Name | Date |
| --- | --- | --- |
| D. 121,706 | Stanchfield | July 30, 1940 |
| D. 142,617 | Coleman | Oct. 23, 1945 |
| 2,285,278 | Hennessy | June 2, 1942 |
| 2,422,918 | Mills | June 24, 1947 |
| 2,429,279 | Salter | Oct. 21, 1947 |

FOREIGN PATENTS

| Number | Country | Date |
| --- | --- | --- |
| 25,621 | Sweden | Mar. 14, 1908 |